3,050,536
21-FLUORO-Δ⁴-PREGNENE-17α-OL-3,20-DIONE
Josef Fried, Princeton, N.J., and Josef E. Herz, Lomas, Mexico City, Mexico, assignors to Olin Mathieson Chemical Corporation, New York, N.Y., a corporation of Virginia
No Drawing. Filed May 8, 1961, Ser. No. 108,309
1 Claim. (Cl. 260—397.47)

This application is a continuation-in-part of our co-pending application Serial No. 599,310, filed July 23, 1956, now abandoned.

This invention relates to the synthesis of steroids and has for its objects the provision of (I) an advantageous process of preparing the new steroid: 21-fluoro-Δ⁴-pregnene-17a-ol-3,20-dione; and (II) said new steroid, which is useful in itself as a physiologically active steroid.

The process of this invention essentially comprises interacting a 21-alkanesulfonic acid ester of Reichstein's Compound S [Δ⁴-pregnene-17a,21-diol-3,20-dione] or the corresponding 21-chloro, bromo or iodo derivative (e.g., 21-chloro-Δ⁴-pregnene-17a-ol-3,20-dione) with potassium fluoride to form 21-fluoro-Δ⁴-pregnene-17a-ol-3,20-dione.

Suitable starting materials utilizable in the process of this invention include the 21-alkanesulfonic acid esters (particularly the lower alkanesulfonic acid esters, as exemplified by the methanesulfonic acid ester) of Compound S, 21-chloro-Δ⁴-pregnene-17a-ol-3,20-dione, 21-bromo-Δ⁴-pregnene-17a-ol-3,20-dione and 21-iodo-Δ⁴-pregnene-17a-ol-3,20-dione. In accordance with the process of this invention, one of these starting materials is interacted with potassium fluoride. This reaction is preferably conducted in an organic solvent of high dielectric constant, such as dimethylformamide, dimethylsulfoxide, and diethylene glycol, optimally at an elevated temperature, such as one in the range of about 100° C. to about 130° C.

The 21-fluoro-Δ⁴-pregnene-17a-ol-3,20-dione steroid of this invention is a physiologically active steroid which possesses mineralocorticoid activity. Thus, the new steroid can be administered instead of, and in the same manner as, desoxycorticosterone in the treatment of Addison's disease. The dosage for such administration is, of course, dependent on the relative activity of the compound. The mineralocorticoid activity of 21-fluoro-Δ⁴-pregnene-17a-ol-3,20-dione is in distinct contrast to analogous compounds. At a minimum dose of 0.25 mg., the 21-fluoro compound causes increased retention of sodium. In contrast, 2.5 mg. of the analogous 21-chloro compound are required to elicit a minimum response in the sodium retention assay. The 21-bromo compound shows no response at 2.5 mg. Only the 21-fluoro compound shows increased potassium excretion at 2.5 mg.; neither the chloro nor bromo compound shows any potassium response at this dose level.

The following example is illustrative of the invention (all temperatures being in centigrade):

EXAMPLE

*21-Fluoro-Δ⁴-Pregnene-17a-ol-3,20-Dione and Δ⁴-Pregnene-17a,21-oxido-3,20-Dione From Δ⁴-Pregnene-17a,12-Diol-3,20-Dione*

(a) PREPARATION OF Δ⁴-PREGNENE-17a,21-DIOL-3,20-DIONE 21-MESYLATE

To a solution of 2.0 g. of Δ⁴-pregnene-17a,21-diol-3,20-dione in 24 ml. of anhydrous pyridine is added at 0° 1.05 ml. of methanesulfonyl chloride, and the mixture is allowed to remain at 0° for 2.5 hours. Ice water is added carefully and the resulting crystalline precipitate filtered off and washed with water. The crude precipitate (about 2.36 g.) after recrystallization from 95% alcohol has the following properties: M.P. about 181–183° (dec.); $[a]_D^{24}$ +123° (c., 0.58 in chloroform).

Analysis.—Calcd. for $C_{22}H_{32}O_6S$ (424.48): C, 62.25; H, 7.60; S, 7.46. Found: C, 61.79; H, 7.13; S, 7.40.

(b) REACTION OF THE MESYLATE WITH POTASSIUM FLUORIDE

A solution of 1.2 g. of the mesylate prepared in part (a) and 1.2 g. of anhydrous potassium fluoride in 120 ml. of dimethylsulfoxide is heated with stirring at 110° for 18 hours. The mixture is diluted with water and the steroid extracted with ethyl acetate. The ethyl acetate extract is washed with water, dried over sodium sulfate and evaporated to dryness in vacuo. The residue on direct crystallization from acetone yields about 110 mg. of the 21-fluoro-Δ⁴-pregnene-17a-ol-3,20-dione, having the following properties: M.P. about 224–226° and 233–235° (dimorphic); $[a]_D^{23}$ +130° (c., 0.34 in $CHCl_3$);

$\lambda_{max}^{alc.}$ 240 mμ (ε=16,800); $\lambda_{max}^{Nujol}$ 2.94, 5.76, 5.99, 6.19μ

Analysis.—Calcd. for $C_{21}H_{29}O_3F$ (348.44): C, 72.38; H, 8.39; F, 5.45. Found: C, 72.37; H, 8.52; F, 5.50.

The combined mother liquor material is dissolved in 40 ml. of benzene and 20 ml. of hexane and chromatographed on 20 g. of sulfuric acid washed alumina. A mixture of benzene-hexane 2:1 (2000 ml.) elutes about 245 mg. of Δ⁴-pregnene-17α,21-oxido-3,20-dione, which after recrystallization from acetone has the following properties: M.P. about 199–201°; $[α]_D^{23}$ +213° (c., 0.61 in $CHCl_3$);

$\lambda_{max}^{alc.}$ 239 mμ (16,600)

$\lambda_{max}^{Nujol}$ No OH bands, 5.51; 6.00, 6.20μ

Analysis.—Calcd. for $C_{21}H_{28}O_3$ (328.43): C, 76.79; H, 8.59. Found: C, 76.72; H, 8.51.

Subsequent elution of the column with 10% chloroform in benzene an additional amount (about 300 mg.) of 21-fluoro-Δ⁴-pregnene-17α-ol-3,20-dione.

(c) REARRANGEMENT OF Δ⁴-PREGNENE-17a,21-OXIDO-3-20-DIONE TO Δ⁴-18-NORPREGNENE-13a,21-OXIDO-3,20-DIONE

A solution of 50 mg. of Δ⁴-pregnene-17α,21-oxido-3,20-dione in 10 ml. of methanol and 0.32 ml. of 8.5% sulfuric acid is refluxed for 1.25 hours. Dilute sodium bicarbonate solution is added after cooling and the neutral solution concentrated in vacuo. The residual aqueous suspension is extracted with chloroform, the chloroform extract washed with water, dried over sodium sulfate and evaporated to dryness in vacuo to yield about 40 mg. of impure Δ⁴-18-norpregnene-13α,21-oxido-3,20-dione, which after recrystallization from acetone-hexane has the following properties: M.P. about 215–217°; $[α]_D^{23}$ +97° (c., 0.43 in chloroform);

$\lambda_{max}^{Nujol}$ 5.71, 6.00, 6.19μ

Analysis.—Calcd. for $C_{21}H_{28}O_3$ (328.44): C, 76.79; H, 8.59. Found: C, 76.77; H, 8.59.

Reported in the literature [Allen et al., J. Am. Chem. Soc., 77, 4784 (1955)]: M.P. 224–226°; $[α]_D^{CHCl_3}$ +92°;

$\lambda_{max}^{Nujol}$ 5.70μ, 6.00μ, 6.19μ

The invention may be otherwise variously embodied within the scope of the appended claim.

We claim:
21-fluoro-Δ⁴-pregnene-17α-ol-3,20-dione.

References Cited in the file of this patent

UNITED STATES PATENTS 2,668,816   Miescher et al. _____ Feb. 9, 1954

FOREIGN PATENTS 717,130   Great Britain _____ Oct. 20, 1954